Feb. 3, 1959 R. A. DAY ET AL 2,872,596

TRANSISTOR VOLTAGE COMPARATOR

Filed March 31, 1955

RICHARD A. DAY
LEE J. BATEMAN
INVENTORS

BY Henry Heyman

ATTORNEY 2,872,596
Patented Feb. 3, 1959

2,872,596

TRANSISTOR VOLTAGE COMPARATOR

Richard A. Day and Lee J. Bateman, Los Angeles, Calif., assignors to Hughes Aircraft Company, Culver City, Calif., a corporation of Delaware Application March 31, 1955, Serial No. 498,290

5 Claims. (Cl. 307—88.5)

This invention relates generally to circuits for comparing the magnitude of two voltages and, more particularly, to a voltage comparator circuit employing a semiconductor translating device as the only active circuit element.

Vacuum tube circuits for comparing the amplitudes of two applied voltages and producing an output pulse when their amplitudes are substantially equal are well known to the art. Such circuits are commonly referred to as "multiar" circuits. A discussion of the operation and design considerations of multiar circuits is contained in vol. 19, Radiation Laboratory Series entitled "Waveforms," page 343, published by McGraw-Hill Book Company, Inc., New York, 1949.

The simplest of these circuits uses two vacuum tubes, a diode and an amplifier, to obtain the desired voltage comparison. The accuracy of the circuit depends directly upon the diode which is selected. The largest source of error of the usual multiar circuit is the cathode drift of the diode; that is, the level at which the diode will conduct is directly dependent on variations of filament heater voltage. If the filament voltage varies as little as ±10%, the conducting level of the diode may vary by 100 millivolts. It is, therefore, readily seen that the accuracy of comparison is quite limited and can be improved only by the addition of another diode or a closely regulated heater supply. The accuracy may be further impaired by changes in other supply voltages, such as plate or bias supplies.

Another problem existing in these circuits is that the amplifier will tend to oscillate as the produced output pulse decreases, thus tending to drive the grid of the amplifier above cut-off. This occurs through the feedback circuitry which is normally a transformer. To compensate for this phenomenon, complex design and costly construction of circuit elements must be employed. Furthermore, the magnitude of the level of voltages which are to be compared is limited by the dynamic operating characteristics of the particular vacuum tubes employed.

Accordingly, it is an object of this invention to provide a voltage comparator circuit which is relatively unlimited in its dynamic range of operation.

Another object of the present invention is to provide a voltage comparator circuit which is substantially insensitive to changes in supply voltages.

A further object of this invention is to provide a comparator circuit for comparing the voltage levels of two applied signals and which will produce an output pulse when the compared signals are within two millivolts of each other.

A voltage comparator circuit in accordance with the present invention comprises a semiconductor translating device having an input electrode, an output electrode, and a common electrode in contact with the semiconductor body. The input and output electrodes are biased so that they are relatively conducting and non-conducting, respectively, in the quiescent condition. An impedance element is connected between the input and common electrodes to regulate the amount of current flowing through the input electrode during quiescent condition. Two input voltages are applied through appropriate coupling circuitry to the input and common electrodes. When the signals to be compared are substantially equal, within two millivolts of each other, an output pulse is developed. This output pulse is coupled back through appropriate circuitry to the common electrode to cause the semiconductor to change rapidly from its quiescent conducting state to a substantially cut-off state of operation.

The novel features of the present invention are set forth in particularity in the appended claims. Other and more specific objects of the invention will become apparent from a consideration of the following description taken in conjunction with the accompanying drawing, in which:

Figure 1:
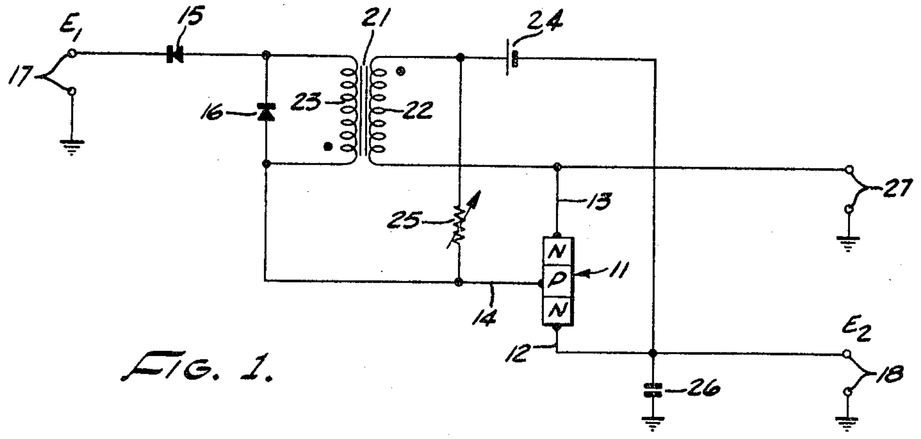
Fig. 1 is a schematic circuit diagram of the preferred embodiment of the comparator circuit of the present invention.

Referring now to the drawing wherein like components are designated by the same reference characters and, more particularly, to Fig. 1, there is illustrated a semiconductor translating device, such as a transistor, represented by a rectangle 11 divided into three equal portions, each having the letter "P" or "N" therein. Rectangle 11, as depicted, shows an N–P–N junction transistor, but it is to be understood that any other type junction transistor could as well be used.

Transistor 11 has an input or emitter electrode 12, an output or collector electrode 13, and a common or base electrode 14 in contact therewith. Two diodes 15 and 16, being poled to pass negative signals, are connected in series between input terminals 17, one of which is grounded, and base 14. Input signal $E_1$ is applied to terminals 17. Emitter 12 is connected to input terminals 18, one of which is grounded, for applying thereto an input signal $E_2$.

Transformer 21, having a primary winding 22 and a secondary winding 23, is used as a feedback coupling device to apply the developed output signal from collector 13 to base 14 with a reversal of polarity. To this end, one terminal of input winding 22 is connected to collector 13. A biasing means, such as battery 24, is connected between the other terminal of primary winding 22 and emitter 12 and poled to maintain the emitter negative with respect to the base. The voltage of battery 24 is not critical, being selected only to cause transistor 11 to be conducting during the quiescent state of operation. One of the terminals of secondary winding 23 is connected to base 14 and the other terminal of winding 23 is connected between diodes 15 and 16. The windings 22 and 23 of transformer 21 are poled as indicated by the dots. An impedance element, such as adjustable resistor 25, is connected between base 14 and the junction of secondary winding 22 and battery 24, and is used to regulate or limit the current flowing through emitter 12. Capacitor 26 is connected between emitter 12 and ground to by-pass any noise which may be present in the applied input signal to ground. One of output terminals 27 is connected to collector 13, the other is grounded.

Figure 3:
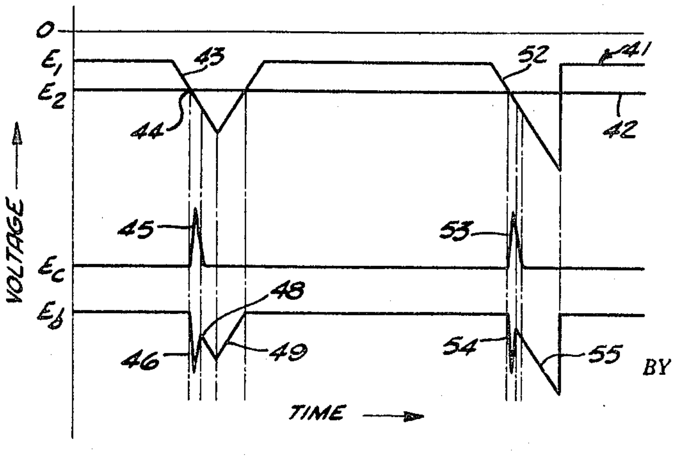
Fig. 3 is a graph illustrating waveforms taken at various points throughout the comparator circuit of Fig. 1.

In describing the operation of the circuit of Fig. 1, reference will be made to Fig. 3 wherein the abscissa represents time and the ordinate, voltage. Input signal $E_1$ is represented by curve 41, and input signal $E_2$ is represented by curve 42. In the quiescent condition, transistor 11 is conducting, the amount of current flowing is controlled by the setting of resistor 25. This is accomplished in the following manner: As the current flows through transistor 11, it also flows through resistor 25. This causes a voltage drop to appear across resistor 25 which maintains collector 13 more positive than base 14 since collector 13 is connected by way of primary winding 22 directly to the positive terminal of battery 24. Therefore, resistor 25 may be considered as a current biasing device.

Since the emitter 12 is maintained by battery 24 negative with respect to base 14 and collector 13 more positive than base 14 due to the voltage drop across resistor 25, a steady current flows through the transistor. The steady state current flowing through transistor 11 causes a magnetic field to build up around primary winding 22 of transformer 21. During operation, input signal $E_1$ may vary in some manner, for example, as shown at 43. If $E_1$ becomes less than $E_2$, as shown at point 44, current flow through base 14 and emitter 12 of transistor 11 will reduce. This reduction in current causes a consequent reduction in current flowing through the collector 13 due to normal transistor action. When current through collector 13 decreases, the magnetic field about primary winding 22 will start to collapse. The collapsing magnetic field produces a positive going pulse 45 at collector 13. Due to the usual transformer action, a corresponding voltage is induced in secondary winding 23. The transformer is wound such that a negative pulse is applied through secondary winding 23 to base 14, as shown at 46 in Fig. 3. This negative pulse causes less current to flow through base 14 and, consequently, less current in collector 13. Thus, the operation is regenerative and the magnetic field continues to collapse, producing a more positive going pulse of voltage at collector 13.

The voltage present on base 14 will follow the pulse produced in winding 22, but with the reverse polarity, thus causing transistor 11 to become non-conducting, until it reaches the amplitude of input signal $E_1$ as shown at 48. From this point, the base voltage will follow input signal $E_1$ as illustrated by curve 41 until it returns to the amplitude of signal $E_2$, as shown at 49 at which time transistor 11 once more becomes conductive. The input signal $E_1$ may vary according to any predetermined configuration, as indicated by the differences between pulses 43 and 52 of curve 41. The operation of the circuit of Fig. 1 will be substantially the same in either case. If a pulse, such as 52, is applied, a positive pulse, such as 53, will be developed at collector 13 and a negative pulse, such as 54, will be developed at base 14, the base then following the variation of the input signal $E_1$, as shown at 55, until it once again reaches the amplitude of signal $E_2$.

When the pulse developed by the collapsing magnetic field in primary winding 22 falls back to its beginnnig point, it will tend to overshoot, thus causing a pulse of the opposite polarity to be developed. If this occurs, transistor 11 would then start conducting again and would repeat the cycle of operation, causing another output pulse to appear. However, diode 16 is poled to prevent this from occurring. The instant the terminal of secondary winding 23 connected to base 14 becomes positive with respect to the other terminal of winding 23, diode 16 conducts, shorting winding 23. This prevents the overshoot, thus stopping all tendency of the transistor to oscillate and stabilizing the transformer as well.

It should be noted that the circuit of Fig. 1 is floating—that is, there is no D. C. return to ground. This enables voltages of any magnitude to be compared by the circuit without damage since the effective voltage on transistor 11 is the difference between $E_1$ and $E_2$, plus the value of battery 24. Capacitor 26 serves two purposes but is not essential to the actual operation of the circuit. If undesired noise is present in signal $E_2$, the capacitance of capacitor 26 is chosen to by-pass such noise to ground. When the circuit of Fig. 1 is used to supply another circuit with a gating or command signal or the like, capacitor 26 is used as the A. C. ground return for the output pulse developed at terminals 27.

Although signal $E_2$ is shown as being constant while $E_1$ varies, it is to be understood that the reverse condition could exist or that both $E_1$ and $E_2$ may be allowed to vary.

It will be understood that the circuit specifications for the voltage comparator circuit shown in Fig. 1 may vary according to the design for any particular application. The following circuit specifications are included by way of example only, suitable for input signals having frequencies of from zero to 10,000 cycles per second.

Transistor 11—N-P-N Junction Transistor—Germanium Products 2501
Diode 15—Silicon Junction—Texas Instrument T-10
Diode 16—Germanium Point Contact—1N100
Transformer 21—Pacific Coast Associates—101-.5
Resistor 25—15,000 ohms
Capacitor 26—1,000 micro-microfarads
Battery 24—1.35 volts If, for example, a P-N-P transistor is used in place of the N-P-N transistor shown in Fig. 1, the diodes 15 and 16 would have to be reversed, the polarity of signals $E_1$ and $E_2$ would have to be positive and battery 24 would have to be reversed. These things accomplished, the circuit would operate essentially as above described, with all polarities reversed.

Figure 2:
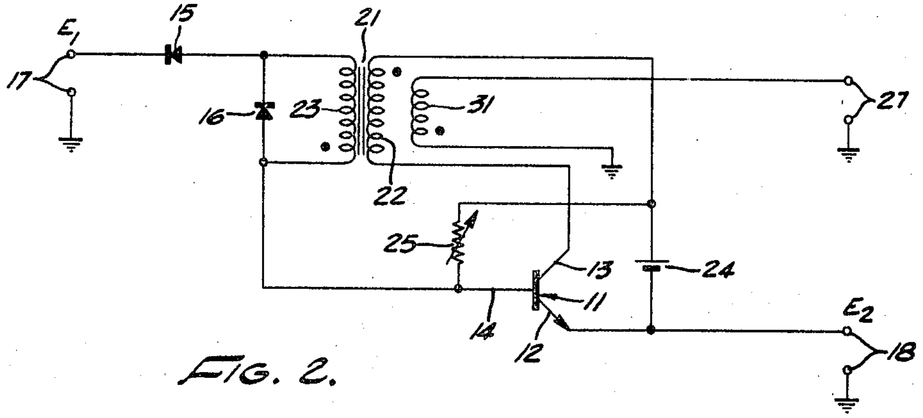
Fig. 2 is a schematic circuit diagram of a modified comparator circuit of the present invention.

Referring now more particularly to Fig. 2, which is substantially the same circuit as that of Fig. 1, with the following exceptions: Transistor 11 is represented by its accepted schematic symbol and capacitor 26 has been eliminated from the circuit. A tertiary winding 31 has been added to transformer 21. Tertiary winding 31 has two terminals connected to output terminals 27, one of which is grounded.

The operation of the circuit, as shown in Fig. 2, is essentially the same as that of Fig. 1, the main difference being that the output signal is taken from tertiary winding 31 instead of from collector 13. In doing this, the circuit of Fig. 2 is completely isolated from ground, while that of Fig. 1 is isolated from D. C. ground only.

There have been thus disclosed two embodiments of a circuit for producing an output pulse when the amplitudes of two input signals are substantially equal, which requires a non-critical supply voltage, has an extremely high accuracy of comparison of two millivolts, and is relatively inexpensive to construct and maintain.

What is claimed is:

1. A voltage comparator circuit for producing an output pulse when the amplitudes of a first and a second input signal become substantially equal, comprising: a junction transistor having an emitter electrode, a collector electrode, and a base electrode in contact therewith; first and second rectifying means serially connected, said second rectifying means being connected to said base electrode; first and second input terminals across which said first input signal is to be applied, said first input terminal being connected to said first rectifying means and said second terminal being connected to a point of fixed potential for applying said first input signal between said base electrode and said point of fixed potential; third and fourth input terminals across which said second input signal is to be applied, said third terminal being connected to said emitter and said fourth terminal being connected to said point of fixed potential for applying said second input signal between said emitter electrode and said point of fixed potential; coupling means connected between said collector and base electrodes for feeding the developed output pulse back to said base electrode with reversed polarity; biasing means connected between said emitter electrode and said coupling means to cause said transistor to be conducting during quiescent conditions; and current biasing means connected between said collector and base electrodes to regulate the amount of current flowing through said transistor.

2. The voltage comparator circuit of claim 1 wherein said junction transistor is of the N–P–N type and said first and second rectifying means are diodes which are poled to pass only negative input signals.

3. A voltage comparator circuit for producing an output pulse when the amplitudes of two input signals to be compared become substantially equal, comprising: a junction transistor having an emitter electrode, a collector electrode, and a base electrode in contact therewith; first and second rectifying means serially connected, said second rectifying means being connected to said base electrode for applying the first input signal thereto; conductive means connected to said emitter electrode for applying the second input signal thereto; a transformer including a primary winding having a first and second terminal and a secondary winding having a third and fourth terminal, said first terminal being connected to said collector electrode, said third terminal being connected to said base electrode, said fourth terminal being connected between said first and second rectifying means; biasing means connected between said emitter electrode and said second terminal to cause said transistor to be conducting during quiescent conditions; an adjustable impedance element connected between said second terminal and said base electrode to regulate the amount of current flowing through said transistor; and a capacitor connected between said emitter electrode and a point of fixed potential.

4. The voltage comparator circuit of claim 3 wherein said adjustable impedance element is a resistor.

5. A voltage comparator circuit for producing an output pulse when the amplitudes of a first and a second input signal become substantially equal, comprising: a junction transistor having an emitter electrode, a collector electrode, and a base electrode in contact therewith; a transformer including a primary winding having a first and second terminal, a secondary winding having a third and fourth terminal, a tertiary winding, said first terminal being connected to said collector electrode, said third terminal being connected to said base electrode; a first diode connected to said fourth terminal; a second diode connected between said third and fourth terminals for applying the first input signal to said base electrode; biasing means including a source of voltage connected between said emitter electrode and said second terminal to cause said transistor to be conducting during quiescent conditions; and a resistive impedance element connected between said second terminal and said base electrode for regulating the amount of current flowing through said transistor, whereby a pulse is developed across said tertiary winding when the first and second input signals become substantially equal in amplitude.

References Cited in the file of this patent

UNITED STATES PATENTS

| | | |
|---|---|---|
| 2,540,923 | Williams | Feb. 6, 1951 |
| 2,620,448 | Wallace, Jr. | Dec. 2, 1952 |
| 2,644,893 | Gehman | July 7, 1953 |
| 2,745,012 | Felker | May 8, 1956 |
| 2,757,243 | Thomas | July 31, 1956 |
| 2,758,208 | Grayson | Aug. 7, 1956 |
| 2,764,688 | Grayson et al. | Sept. 25, 1956 |
| 2,777,092 | Mandelkorn | Jan. 8, 1957 |
| 2,799,784 | Harris et al. | July 16, 1957 |
| 2,802,118 | Simkins | Aug. 6, 1957 |